US009274736B2

(12) United States Patent
Kobayashi

(10) Patent No.: US 9,274,736 B2
(45) Date of Patent: Mar. 1, 2016

(54) INFORMATION PROCESSING APPARATUS, OUTPUT SYSTEM, INFORMATION PROCESSING METHOD, AND RECORDING MEDIUM STORING INFORMATION PROCESSING PROGRAM

(71) Applicant: Hiroto Kobayashi, Saitama (JP)

(72) Inventor: Hiroto Kobayashi, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/975,787

(22) Filed: Aug. 26, 2013

(65) Prior Publication Data

US 2014/0063522 A1 Mar. 6, 2014

(30) Foreign Application Priority Data

Aug. 29, 2012 (JP) ................................. 2012-188865
Jun. 14, 2013 (JP) ................................. 2013-126165

(51) Int. Cl.
*G06F 3/12* (2006.01)

(52) U.S. Cl.
CPC ............ *G06F 3/1293* (2013.01); *G06F 3/1207* (2013.01); *G06F 3/1259* (2013.01); *G06F 3/1288* (2013.01); *G06F 3/121* (2013.01); *G06F 3/124* (2013.01); *G06F 3/1275* (2013.01); *G06F 2206/1512* (2013.01); *G06F 2206/1514* (2013.01)

(58) Field of Classification Search
None
See application file for complete search history.

(56) References Cited

U.S. PATENT DOCUMENTS

2004/0239713 A1* 12/2004 Kang .............................. 347/19
2005/0086282 A1* 4/2005 Anderson et al. ............. 709/200
2010/0302589 A1 12/2010 Kobayashi
2011/0058199 A1 3/2011 Kobayashi
2011/0242598 A1* 10/2011 Ohara .......................... 358/1.15
2011/0286036 A1 11/2011 Kobayashi
2012/0140269 A1 6/2012 Kobayashi
2013/0044335 A1 2/2013 Kobayashi
2013/0094056 A1 4/2013 Kobayashi

FOREIGN PATENT DOCUMENTS

EP 0982650 A1 3/2000
JP 2003-167718 6/2003
JP 2010-191994 9/2010
JP 2010-198151 9/2010
JP 2013-088869 5/2013

OTHER PUBLICATIONS

European Extended Search Report and Written Opinion dated Jul. 7, 2014 issued in corresponding European Application No. 13181922.9.

* cited by examiner

*Primary Examiner* — John Wallace
(74) *Attorney, Agent, or Firm* — Harness, Dickey & Pierce, P.L.C.

(57) ABSTRACT

An information processing apparatus, output system, information processing method, and an information processing program stored in a non-transitory recording medium, each of which controls interaction between an upper-level program and a lower-level program, by providing the functions of: storing output processing information relating to output processing being performed or to be performed on output data, in association with output data identification information; and sending the output processing information associated with the output data identification information to the upper-level program, in response to the output data identification information received from the upper-level program.

19 Claims, 14 Drawing Sheets

| JOB ID | LOG |
|---|---|
| JobID1 | COMPLETED |
| JobID2 | ERROR |
| JobID3 | COMPLETED |
| ⋮ | ⋮ |

INFORMATION PROCESSING APPARATUS, OUTPUT SYSTEM, INFORMATION PROCESSING METHOD, AND RECORDING MEDIUM STORING INFORMATION PROCESSING PROGRAM

CROSS-REFERENCE TO RELATED APPLICATIONS

This patent application is based on and claims priority pursuant to 35 U.S.C. §119 to Japanese Patent Application Nos. 2012-188865, filed on Aug. 29, 2012, and 2013-126165, filed on Jun. 14, 2013, in the Japan Patent Office, the entire disclosure of which is hereby incorporated by reference herein.

BACKGROUND

1. Technical Field

The present invention relates to processing output processing information, and more specifically, to an information processing apparatus, an output system, an information processing method, and a non-transitory recording medium storing an information processing program, each of which processes output processing information.

2. Description of the Related Art

The network print systems may be provided in various organizations such as companies, government agencies, or hospitals, in which printing may be performed using at least one printer selected from a plurality of printers available through a network. Various techniques are proposed, which monitor print processing being performed by each printer in the print system, and notifies a user of information relating to the print processing. For example, Japanese Patent Application Publication No. 2003-167718-A discloses a print control system provided with a status monitor that monitors print processing performed by a print processor. In this print control system, the status monitor determines whether a data stream of print data is stopped due to preview processing at the print processor, and when the data stream of print data is stopped, sends notification to the user. This print system, however, is not capable of monitoring processing at the print processor after EMF spooling or processing at the graphic driver. Even when an error occurs after EMF spooling, the application is not able to obtain information regarding an error such that the user is not notified of the occurrence of the error.

SUMMARY

Example embodiments of the present include an information processing apparatus, output system, information processing method, and an information processing program stored in a non-transitory recording medium, each of which is capable of controlling interaction between an upper-level program and a lower-level program. The apparatus, system, method, and the program stored in the recording medium are each provided with the functions of: storing output processing information relating to output processing being performed or to be performed on output data, in association with output data identification information; and sending the output processing information associated with the output data identification information to the upper-level program, in response to the output data identification information received from the upper-level program.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is an example data structure of job data managed by the information processing apparatus of FIG. 2;

Figure 1:
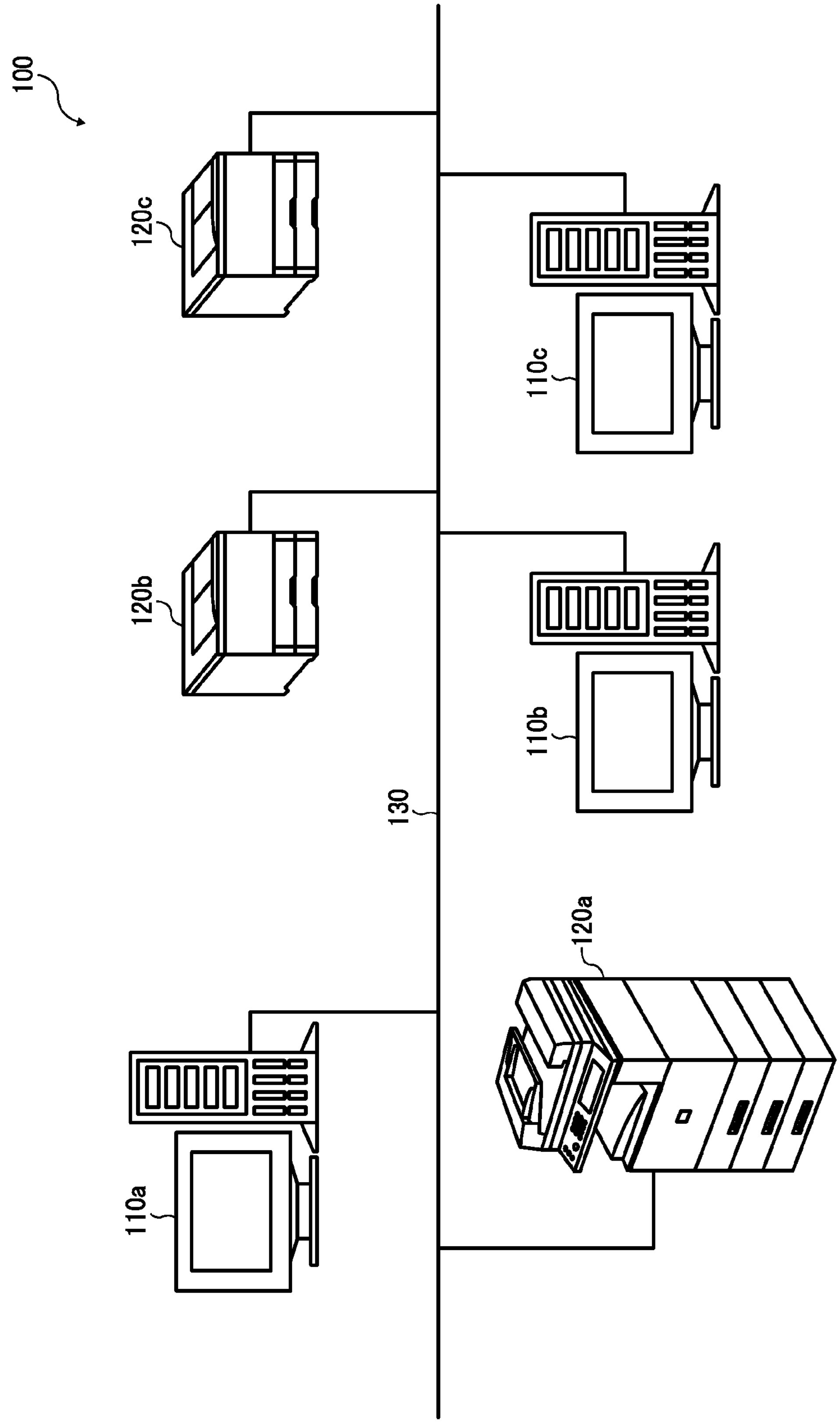
FIG. 1 is a configuration of a print system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

FIG. 1 illustrates a configuration of a print system according to an example embodiment of the present invention. The print system 100 includes a plurality of information processing apparatuses 110*a*, 110*b*, and 110*c*, and a plurality of printers 120*a*, 120*b*, and 120*c*, which are connected through a network 130.

The information processing apparatuses 110*a*, 110*b*, and 110*c* are each capable of instructing at least one of the printers 120*a*, 120*b*, and 120*c* to perform printing. For simplicity, the information processing apparatuses 110*a*, 110*b*, and 110*c* may be collectively or each referred to as the information processing apparatus 110. The information processing apparatus 110 includes a processor that performs calculation, a main memory such as a random access memory (RAM), and a supplementary memory such as a hard disk drive (HDD). In this example, a computer executable program, which may be written in any desired programming language such as C, C++, C#, JAVA™, or JAVA Script™, is deployed onto the main memory, and executed under an operating system (OS) such as the Windows™, UNIX™, LINUX™, and Mac OS™, to cause the information processing apparatus 110 to perform various functions as described below.

For simplicity, the printers 120*a*, 120*b*, and 120*c* may be collectively or each referred to as the printer 120. The printer 120 is implemented as a network printer that prints an image on a recording sheet using print data generated by the information processing apparatus 110. In this example illustrated in FIG. 1, the printer 120 is implemented as a multiple function printer (MFP) or a page printer.

The network 130 allows communication between or among the information processing apparatuses 110 and the printers 120. In this example illustrated in FIG. 1, the network 130 is implemented by a narrow area network such as a local area network (LAN). The network 130 may alternatively or additionally include a wide area network such as the Internet.

Figure 2:
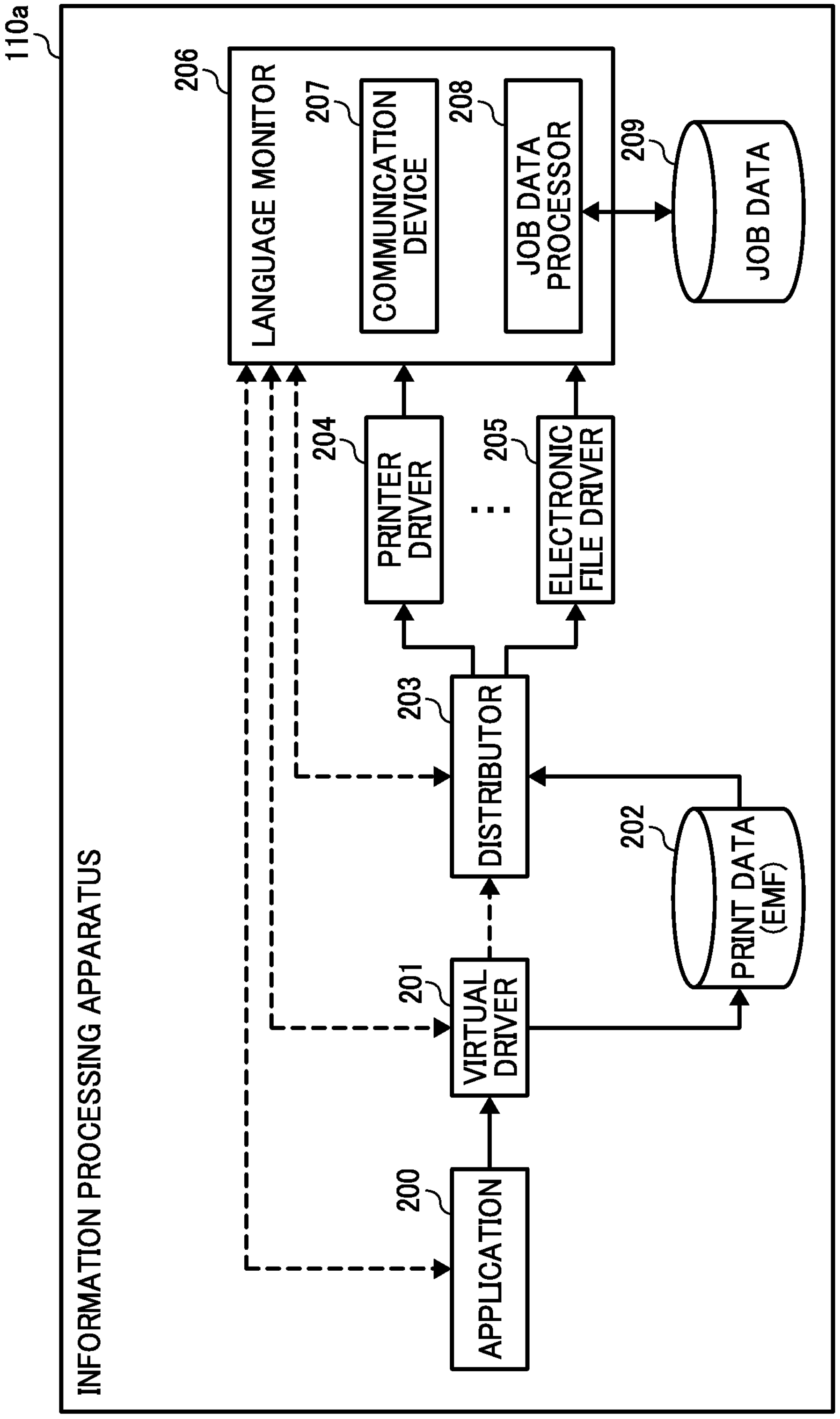
FIG. 2 is a schematic block diagram illustrating a functional structure of an information processing apparatus provided in the print system of FIG. 1.

FIG. 2 is a schematic block diagram illustrating a functional structure of the information processing apparatus 110*a* in the print system of FIG. 1. Referring to FIG. 2, the functional structure of the information processing apparatus 110*a*, which is installed with the Windows™ OS, is described as an example. In this example, it is assumed that the information processing apparatuses 110*b* and 110*c* are substantially similar in functional structure and operation to the information processing apparatus 110*a*.

The information processing apparatus 110*a* includes application 200, a virtual driver 201, a storage device 202, a storage device 209, a distributor 203, a printer driver 204, an electronic file driver 205, and a language monitor 206.

The application 200 includes various application programs including, for example, document generation program that generates data to be printed ("print data"), spreadsheet program, image edit program, etc. The application 200 instructs the virtual driver 201 to print an image, according to a user instruction.

The virtual driver 201 generates print data according to a user instruction for printing, received from the application 200. When the print instruction is received from the application 200, the virtual driver 201 causes a drawing program, such as a graphics device interface (GDI) of the Windows OS, to generate print data in enhanced metafile (EMF), and spool the print data in the storage device 202. The virtual driver 201 further activates the distributor 203. In this example, the print data is spooled in EMF, but the print data may be spooled in any desired format of intermediate data, such as in a RAW format. Alternatively, the file format of the intermediate data, in this example, the print data, may be windows metafile (WMF) or PostScript. The virtual driver 201 functions as a generator that generates print data ("first print data") having an intermediate data file format.

The distributor 203 is provided with the function of distributing, or transferring, the first print data to one or more of a plurality of drivers provided for the information processing apparatus 110*a*. In this example illustrated in FIG. 1, the distributor 203 distributes the print data in EMF format ("first print data"), which is spooled in the storage device 202, either one of, or respectively to, the printer driver 204 and the electronic file driver 205. The destination to which the first print data is transferred is determined based on a user instruction received at the application 200. More specifically, the user instruction may be input by a user, for example, through a print setting screen displayed by each printer driver through a display provided for the information processing apparatus 110. The distributor 203 transfers the first print data to the destination determined based on the user instruction.

The printer driver 204 controls a printer, such as the printer 120, in the print system 100. The printer driver 204 converts the print data from EMF to RAW, so that the print data can be interpreted by the printer 120 controlled by the printer driver 204, and sends the print data in RAW to the printer 120 through the language monitor 206.

The electronic file driver 205 is provided with the function of converting the print data in intermediate data format to have an electronic file format. The electronic file driver 205 converts the print data in EMF to an electronic file such as in PDF, and stores the converted file at a storage area specified by the user. The storage area at which the electronic file is stored may be specified by a user through a print settings screen provided by the electronic file driver 205, which may be displayed through a display provided for the information processing apparatus 110.

For example, assuming that a storage area of the information processing apparatus 110*a* is specified as the storage area at which the electronic file is stored, the electronic file driver 205 stores the electronic file in the specified storage area in the information processing apparatus 110*a*. In another example, assuming that a storage area other than the storage area of the information processing apparatus 110*a* is specified, such as a storage area of another information processing apparatus 110, the electronic file driver 205 sends the electronic file to that information processing apparatus 110 having the specified storage area through the language monitor 206.

In this example illustrated in FIG. 2, the information processing apparatus 110*a* is provided with two drivers 204 and 205. Alternatively, the information processing apparatus 110*a* may be provided with any desired number of printer drivers, such that the distributor 203 may distribute print data to one or more printers respectively controlled by the print drivers. For example, a driver that converts the print data in intermediate data format to the electronic file and transmits the electronic file via email may be provided. The printer driver such as the printer driver 204 or the electronic file driver 205 functions as a driver, which converts the print data in intermediate data format ("first print data") to print data in output data format ("second print data").

Further, in this example, since print data is not only limited to data to be printed, as in case of data to be processed by the electronic file driver 205, the print data may be one example of output data to be processed. In a substantially similar manner, since the printer driver does not only relate to print processing, as in case of processing being performed by the electronic file driver 205, the printer driver may be one example of a converter that converts output data having an intermediate data format, to converted data having an output data format. In this example, the output data format may be any data format that is compatible to a destination to which the output data is transferred for output processing, such as the data format interpretable by the destination printer, or the electronic file format being stored at the destination storage area. For simplicity, in this example, the printer data ("first print data") is used as an example of output data having an intermediate data format, and the print data or the electronic file format ("second print data") is used as an example of output data having an output data format.

The language monitor 206 sends the print data generated by the printer driver 204 or the electronic file generated by the electronic file driver 205, to the printer 120 or the specified storage area in the information processing apparatus 110. The language monitor 206 stores job data relating to a job executed by the driver in the storage device.

The language monitor 206, which operates under a print architecture of the Windows, is generally provided with the function of making interaction between a spooler and a port monitor. For example, such function includes transmitting or receiving (relaying) data between the spooler and the port monitor. The language monitor 206 receives data from the spooler (print processor), and sends the received data to the port monitor. In this example, the language monitor 206 is provided with the function of controlling transmission or reception (relay, or interaction) of various data between the driver such as the print driver 204 or the electronic file driver 206, and the printer 120 or the storage area at which the electronic file is stored. Using this function of interacting, the language monitor 206 transfers the converted output data having the output data format, such as the print data (second print data) in output data format or the electronic file, to the destination. More specifically, the converted output data, received from the driver via the spooler, is transferred to the destination via the port monitor, using the interaction function of the language monitor 206.

Further, in this example, the language monitor 206 is provided with the function of storing the job data, and the function of transferring the job data being stored in response to a request from the higher-level program. More specifically, as illustrated in FIG. 2, the language monitor 206 is designed to additionally include a communication device 207 and a job data processor 208.

In one example, the communication device 207 transmits the second print data provided by the print driver 204 to the destination printer 120 (120*a*, 120*b*, or 120*c*), which is controlled by the printer driver 204, through the network 130. In another example, the communication device 207 transmits the electronic data provided by the electronic file driver 205 to the destination storage area in the information processing apparatus 110*a*, or to the information processing apparatus 110*b* or 110*c* through the network 130, which is specified according to the user instruction.

The job data processor 208 processes the job data. The job data processor 208 stores the job data in the storage device 209, and sends the job data being stored in the storage device 209 to the other device in response to a request from the other device such as the other functional module of the information processing apparatus 110*a*.

FIG. 3 is an illustration for explaining an example data structure of job data 300, stored in the storage device 209 of the information processing apparatus 110*a*. The job data includes a job ID for uniquely identifying a job that is assigned by the Windows OS, and a log of the job identified by the job ID. Referring to FIG. 3, the log identified by the "JobID1" indicates that the job successfully completes. The log identified by the "JobID2" indicates that the job ends in error. In this example, the log indicating the processing result of the job is only stored. Alternatively or additionally, the log may indicate the contents of all processing executed to complete the job or time at which each processing is executed. The log, or the job data, is one example of output processing information regarding the output processing being performed, which is executed under control of the printer driver 204 or the electronic file driver 205.

When the higher-level program, such as the application 200, the virtual driver 201, or the distributor 203, sends a request to the language monitor 205 while specifying a job ID of job data to be obtained, the job data processor 208 obtains a log related to the specified job ID from the storage device 209, and provides the obtained log to the higher-level program that sends the request. The higher-level program, such as the application 200, may display the obtained log onto a display of the information processing apparatus 110*a*, through a GUI (graphical user interface).

The storage device 209 that stores the job data is a memory area managed by the Windows OS. The job data may be obtained by the other functional device such as the other functional module only via the language monitor 206. In this example, the higher-level program such as the application 200, the virtual driver 201, or the distributor 203 is able to obtain the job data using SendRecyBidiDataFromPort, which is an API provided by the Windows OS. The higher-level program uses this API to obtain a log of the job from the storage device 209 for a selected one of a plurality of drivers installed onto the information processing apparatus 110*a*.

For example, error information, which is stored in a memory area managed by the Windows OS, may be obtained as one example of the log, without previously assigning the higher-level program with an access right to the memory area managed by the Windows OS. Under the general-purposes Windows OS system, in case the functional device without the access right accesses the memory area managed by the Windows OS, the Windows OS asks the user whether to permit the functional device to be assigned with the access right to the memory area. In this example, the API provided by the OS can be used to access the memory area managed by the Windows OS, such that it is not necessary to ask the user whether to permit assignment of the access right.

In the conventional print system based on the EMF or RAW spool format, the application and the virtual driver are made free from print processing as long as spooling completes.

When an error occurs during subsequent processing executed by the printer driver or the electronic file driver, as the subsequent processing is not generated by the higher-level program such as the application or the virtual driver, the higher-level program is not able to obtain error information. On contrary, in this example, even when the higher-level program such as the application 200 or the virtual driver 201 is made free from print processing as spooling completes, an error that may be generated during subsequent processing can be obtained to notify the user.

Figures 4, 4A:
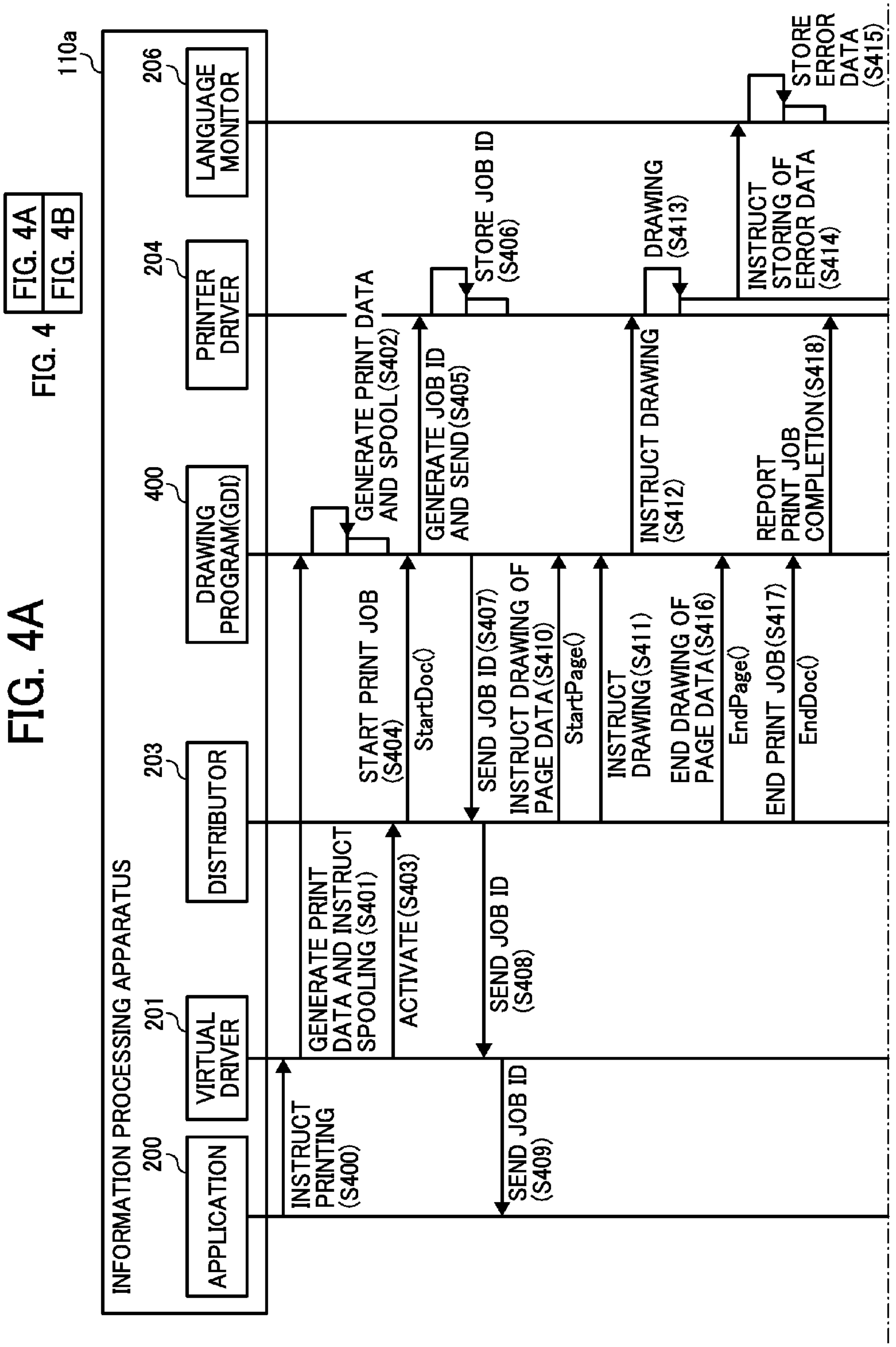
FIGS. 4A and 4B are a data sequence diagram illustrating operation of processing information regarding printing, performed by the information processing apparatus of the print system of FIG. 1, according to an example embodiment of the present invention.
Figure 4B:
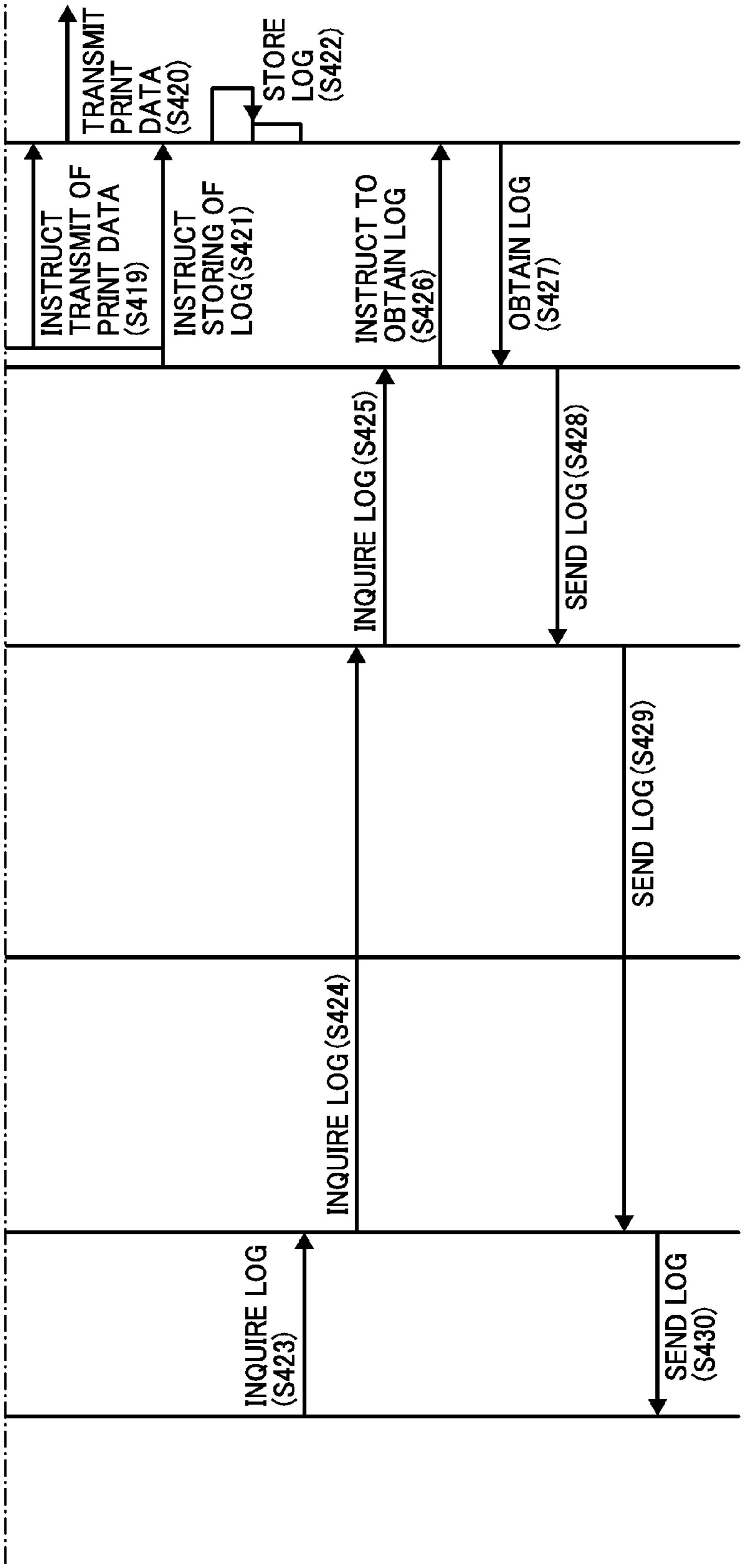

FIGS. 4A and 4B are a data sequence diagram illustrating operation of processing information relating to printing, performed by the information processing apparatus 110*a* of the print system 100, according to an example embodiment of the present invention. In this example referring to FIGS. 4A and 4B, the information processing apparatus 110*a* receives a user instruction for printing data using the printer 120 controlled by the printer driver 204.

At S400, the application 200 of the information processing apparatus 110*a* instructs the virtual driver 201 to print data using the printer 120. At S401, the virtual driver 201 instructs the drawing program 400 of the Windows OS, such as the GUI installed onto the information processing apparatus 110*a*, to generate print data and spool the print data. At S402, the drawing program 400 generates the print data in EMF, and spools the print data in the storage device 202. As described above, the print data may have any desired intermediate data format.

After instructing the drawing program 400 to generate and spool print data, at S403, the virtual driver 201 activates the distributor 203. At S404, the distributor 203 instructs the drawing program 400 to start a print job. In this example, the distributor 203 instructs the drawing program 400 to start a print job, using the StartDoc function, which is the API provided by the Windows OS.

At S405, the drawing program 405 generates a job ID that uniquely identifies the print job, and sends the job ID of the print job to the printer driver 204. At S406, the printer driver 204 stores the job ID in a memory, such as in its internal memory.

At S407, the drawing program 400 transmits the job ID to the distributor 203. At S408, the distributor 203 transmits the job ID to the virtual driver 201. At S409, the virtual driver 201 transmits the job ID to the application 200.

The operation of notifying the upper-level program of the job ID may be performed in various other ways. In one example, the drawing program 400 may transmit the application 200 and the virtual driver 201 with the job ID. Alternatively, the drawing program 400 may store the job ID in a memory area of a storage device provided for the information processing apparatus 110, which may be referred to by the application 200, virtual driver 201, and distributor 203.

At S410, the distributor 203 provides the drawing program 400 with control data needed for printing a new page, and instructs the drawing program 400 to draw page data based on the control data. At S411, the distributor 203 instructs the drawing program 400 to draw print data. In this example, the distributor 203 may provide the drawing program 400 with the control data, using the StartPage function, which is the API provided by the Windows OS.

At S412, the drawing program 400 sends the print data in EMF, which is spooled, to the printer driver 204, and instructs the printer driver 204 to start drawing based on the print data. At S413, the printer driver 204 performs drawing processing. More specifically, the printer driver 204 converts the print data in EMF, obtained from the drawing program 400, to the print data in RAW.

If an error occurs during the drawing processing performed by the printer driver 204, at S414, the printer driver 204 instructs the language monitor 206 to store error information. When an instruction for storing the error information is received, at S415, the job data processor 208 of the language monitor 206 stores the error information in the storage device 209, in association with the job ID for identifying the print job. The job ID has been generated by the drawing program 400 at S405. For example, the job ID may be provided by the printer driver 204.

At S416, the distributor 203 instructs the drawing program 400 to complete drawing of page data. In this example, the distributor 203 instructs to complete drawing of page data, using the EndPage function, which is the API provided by the Windows OS. At S417, the distributor 203 instructs the drawing program 400 to end the print job. In this example, the distributor 203 instructs to end the print job using the EndDoc function, which is the API provided by the Windows OS.

At S418, the drawing program 400 notifies the printer driver 204 of completion of the print job. At S419, the printer driver 204 provides the converted print data in RAW data format to the language monitor 206, and causes the language monitor 206 to send the converted print data to the printer 120 controlled by the printer driver 204. At S420, the communication device 207 of the language monitor 206 sends the converted print data to the printer 120 via the network 130.

When printing is completed, the language monitor 206 stores the job data indicating completion of the print job. For example, the language monitor 206 stores status information of the destination printer, which may be obtained from MIB information received from the printer using SNMP.

At S421, the printer driver 204 sends the log relating to the print job to the language monitor 206 with an instruction to store the log, and the drawing processing ends. At S422, the job data processor 208 of the language monitor 206 stores the job data, such as the log related to the print job, in the storage device 209 in association with the job ID for identifying the print job. In case the error information for the print job is stored in the storage device 209 at S415, the job data processor 208 does not have to store the error information at S422 as the job data. Further, in case the status information for the print job is stored at S420, the job data processor 208 does not have to store the status information as the job data.

The upper-level program, such as the application 200, may inquire about whether the print job is successfully completed, or whether there is any error information related to the print job, at any desired time. At S423 to S425, the application 200 may request the printer driver 204 for the log related to the print job, via the virtual driver 201 and the drawing program 400. More specifically, the application 200 specifies the job ID, and inquires for the log associated with the job ID. For example, the ExtEscape function, which is the API provided by the Windows OS, may be used for inquiry.

At S426, the printer driver 204 instructs the language monitor 206 to obtain a log for the print job identified by a specific job ID, specified by the application 200. At S427, the language monitor 206 reads out the log associated with the specified job ID in response to the instruction, and sends the obtained log to the printer driver 204. At S428 to S430, the printer driver 204 sends the obtained log to the application 200, through the virtual driver 201 and the drawing program 400.

Alternatively, the application 200 may transmit the request for obtaining a log, directly to the language monitor 206, without intervening the virtual driver 201, the drawing program 400, and the printer driver 204. In such case, the language monitor 206 may transmit the log to the application 200 directly, in response to such request.

The inquiry of whether the print job is successfully completed or the inquiry for error information may be performed for more than once. For example, when the printer driver 204 or the electronic file driver 205 processes print data in EMF, the application 200 is not able to know the time at which processing is completed by each driver. Until desired information is made available to the application 200, the application 200 may send an inquiry for more than once. For example, S423 to S430 of FIG. 4 may be performed for more than once.

For example, the application 200 may send an inquiry for a plurality of times, while designating a unique job ID for each inquiry, or designating the same job ID for each inquiry. In another example, when the log includes a plurality of types of information such as information indicating whether the print job is successfully completed, error information, information regarding processing, or time information, the application 200 may send an inquiry for a plurality of times, while designating a unique job ID for each inquiry associated with each type of information.

As described above, in this example of performing print processing using the spooling technique, the higher-level program is able to obtain job information such as error information even when an error occurs during processing after spooling.

Figure 5:
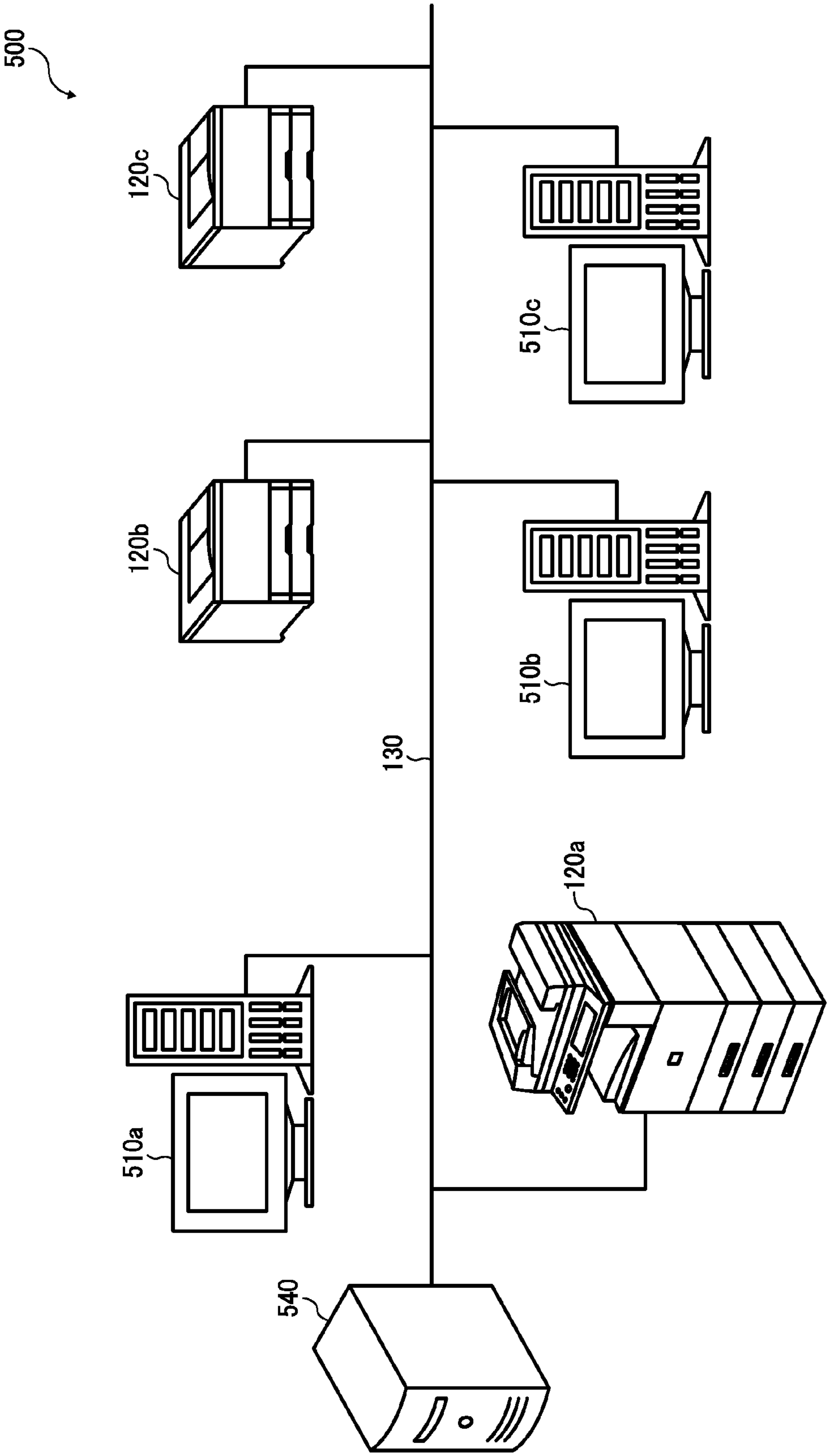
FIG. 5 is a configuration of a print system according to an example embodiment of the present invention.

FIG. 5 illustrates a configuration of a print system 500 according to an example embodiment of the present invention. The print system 500 of FIG. 5 is substantially similar in function and operation to the print system 100 of FIG. 1, except for some differences.

The print system 500 is a print system of a server-client type. The print system 500 includes a plurality of clients 510*a*, 510*b*, and 510*c*, a plurality of printers 120*a*, 120*b*, and 120*c*, and a print server 540, which are connected through a network 130. In the print system 500, the printers 120*a*, 120*b*, and 120*c*, each of which functions as a network printer, are shared among the clients 510*a*, 510*b*, and 510*c*, using the printer sharing technique such as Point & Print.

The clients 510, 510*b*, and 510*c* are each implemented by an information processing apparatus capable of instructing the printers 120*a*, 120*b*, and 120*c* to perform printing through the print server 540. For simplicity, the clients 510*a*, 510*b*, and 510*c* may be collectively or each referred to as the client 510. The client 510 has a hardware structure that is substantially similar to the hardware structure of the information processing apparatus 110 of FIG. 1.

The print server 540 is implemented by an information processing apparatus that causes at least one of the printers 120*a*, 120*b*, and 120*c* to perform printing according to a print request received from at least one of the clients 510*a*, 510*b*, and 510*c*. The print server 540 includes a processor that performs calculation, a main memory such as a RAM, and a supplementary memory such as a HDD. In this example, a computer executable program, which may be written in any desired programming language such as C, C++, C#, JAVA®, or JAVA Script®, is deployed onto the main memory, and executed under an operating system (OS) such as the Windows®, UNIX®, LINUX®, and Mac OS®, to cause the print server 540 to perform various functions as described below.

Figure 6:
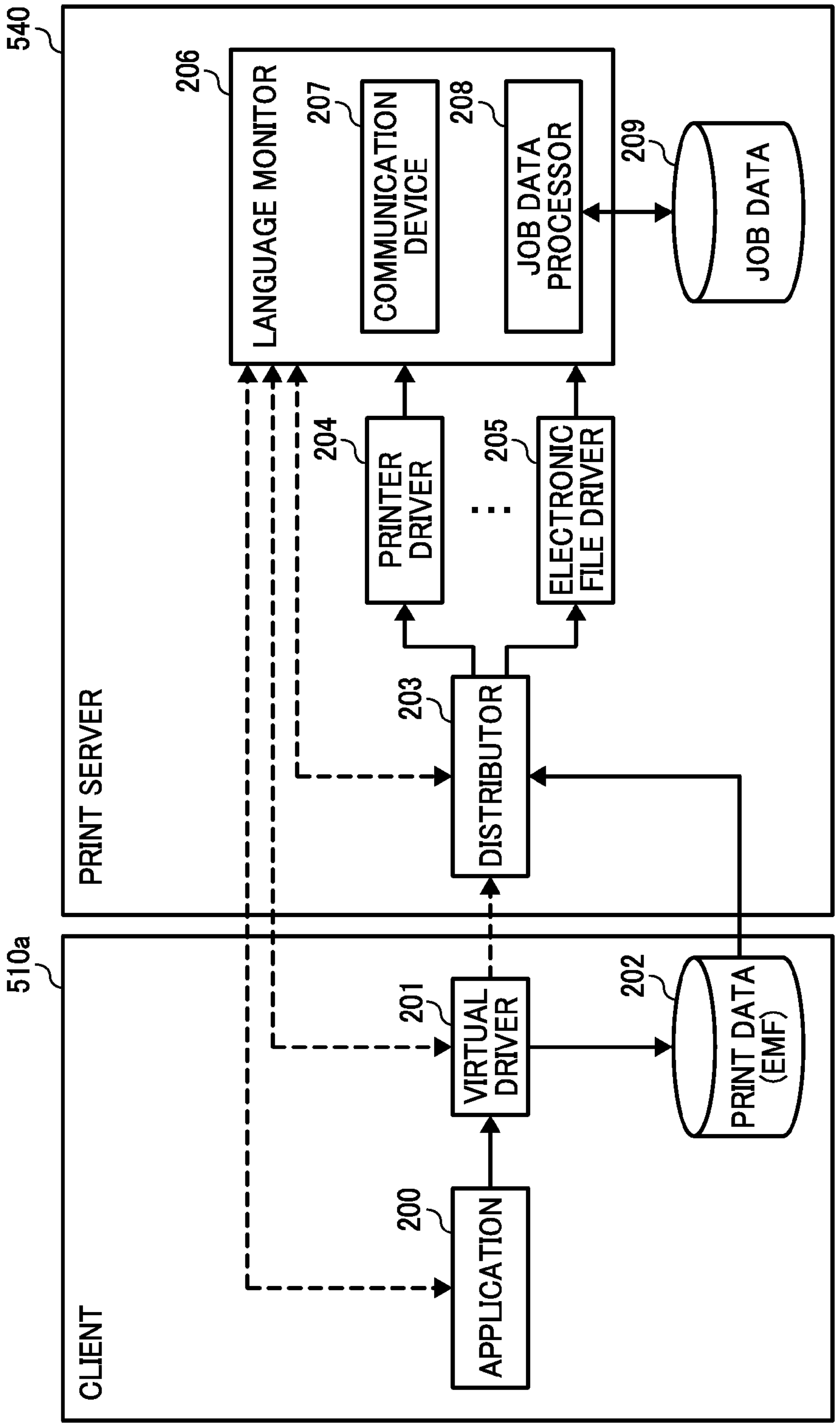
FIG. 6 is a schematic block diagram illustrating a functional structure of a client and a print server, provided in the print system of FIG. 5.

FIG. 6 is a schematic block diagram illustrating a functional structure of the client 510*a* and the print server 540 in the print system 500. Referring to FIG. 6, the functional structures of the client 510*a*, which is installed with the Windows™ OS, and the print server 540, are described as an example. In this example, it is assumed that the clients 500*b* and 500*c* are substantially similar in functional structure and operation to the client 500*a*.

The client 510*a* includes the application 200, the virtual driver 201, and the storage device 202, which respectively correspond to the application 200, the virtual driver 201, and the storage device 202 of the print system 100 of FIG. 2.

The virtual driver 201 generates print data according to a user instruction for printing received from the application 200. When the print instruction is received from the application 200, the virtual driver 201 causes the drawing program, such as the GDI of the Windows OS installed onto the client 510*a*, to generate print data in EMF, based on data to be printed that is generated by the application 200. The virtual driver 201 further spools the print data in the storage device 202, and sends the print data to the print server 540. In this example, the print data is spooled in EMF, but the print data may be spooled in any desired intermediate data format such as RAW. The other examples of intermediate data file format include, but not limited to, WMF and PostScript.

The client 510*a* may further include the printer driver 204 and the electronic file driver 205. The printer driver 204 may provide a print settings screen to be used for specifying a destination to which the print data is transferred. The electronic file driver 205 may provide a print settings screen to be used for specifying a destination at which the electronic file is stored.

The print server 540 includes the distributor 203, the printer driver 204, the electronic file driver 205, the language monitor 206, and the storage device 209, which respectively correspond to the distributor 203, the printer driver 204, the electronic file driver 205, the language monitor 206, and the storage device 209 of the print system 100 of FIG. 2. When the print data having the intermediate data format is received from the client 510*a*, the distributor 203 distributes print data to a plurality of print drivers of the print server 540, such as to the printer driver 204 or the electronic file driver 205.

Figure 7A:
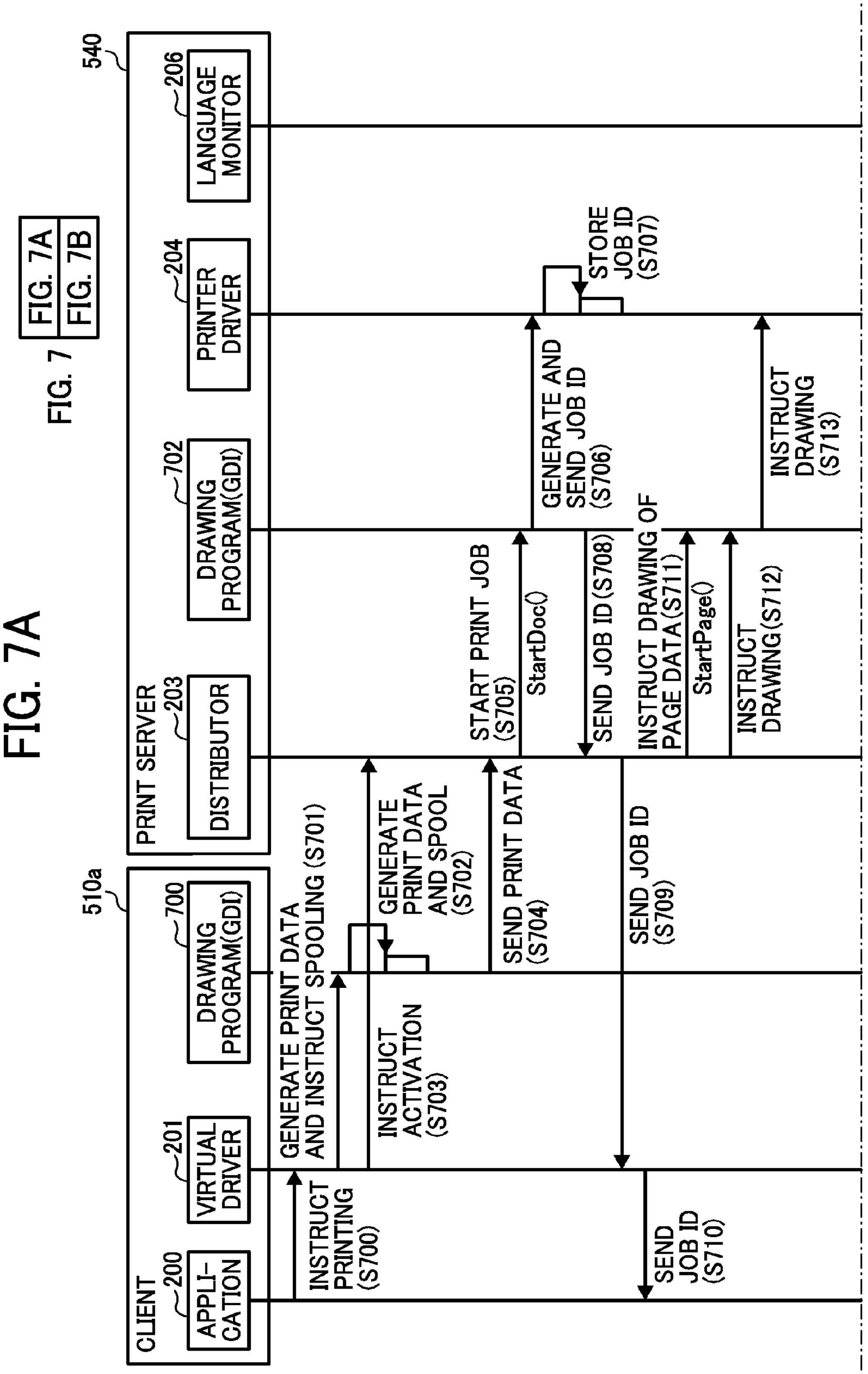
FIGS. 7A and 7B are a data sequence diagram illustrating operation of processing information regarding printing, performed by the print system of FIG. 5, according to an example embodiment of the present invention.
Figure 7B:
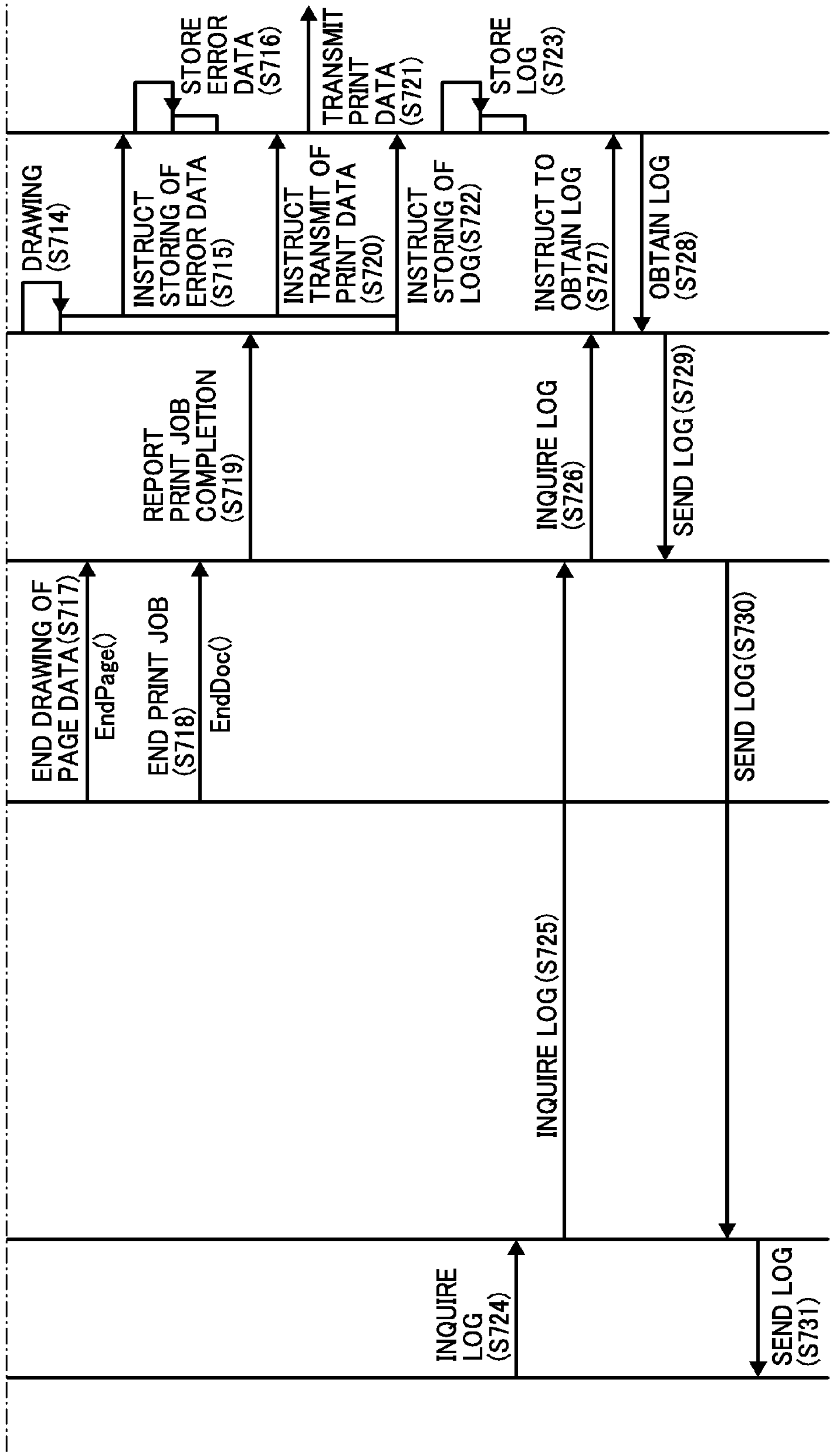

FIGS. 7A and 7B are a data sequence diagram illustrating operation of processing information relating to printing, performed by the print system 500, according to an example embodiment of the present invention. In this example referring to FIGS. 7A and 7B, the client 510 receives a user instruction for printing data using the printer 120 controlled by the printer driver 204 of the print server 540.

At S700, the application 200 of the client 510*a* instructs the virtual driver 201 to print data using the printer 120. At S701, the virtual driver 201 instructs the drawing program 700 of the Windows OS, such as the GUI installed onto the client 500*a*, to generate print data and spool the print data. At S702, the drawing program 700 generates the print data in EMF, and spools the print data in the storage device 202. As described above, the print data may have any desired intermediate data format.

After instructing the drawing program 700 to generate and spool print data, at S703, the virtual driver 201 sends an instruction for activating the distributor 203 to the print server 540 to activate the distributor 203. When the print data is generated and spooled, at s704, the drawing program 700 sends the print data to the print server 540.

At S705, the distributor 203 of the print server 540, which receives the print data from the client 510*a*, instructs the drawing program 702 of the Windows OS, such as the GDI installed on the print server 540, to start a print job. At S706, the drawing program 702 generates a job ID that uniquely identifies the print job to be performed, and sends the job ID So the printer driver 204. At S707, the printer driver 204 stores the job ID in a memory, such as in its internal memory.

At S708, the drawing program 702 sends the job ID to the distributor 203. At S709, the distributor 203 sends the job ID to the virtual driver 201 of the client 510*a*. At S710, the virtual driver 201 sends the job ID to the application 200.

The operation of notifying the upper-level program of the job ID may be performed in various other ways. In one example, the drawing program 702 may send the job ID to the application 200 and the virtual driver 201 of the client 510*a*, directly, without sending the job ID to the distributor 203.

At S711, the distributor 203 provides the drawing program 702 with control data needed for printing a new page, and instructs the drawing program 702 to draw page data based on the control data. At S712, the distributor 203 instructs the drawing program 702 to draw print data. At S713, the drawing program 702 sends the print data in EMF, received from the client 510*a*, to the printer driver 204 and instructs the printer driver 204 to start drawing based on the print data. At S714, the printer driver 204 performs drawing processing, in which the print data in EMF is converted to print data in RAW.

If an error occurs during the drawing processing performed by the printer driver 204, at S715, the printer driver 204 instructs the language monitor 206 to store error information. When an instruction for storing the error information is received, at S716, the job data processor 208 of the language monitor 206 stores the error information in the storage device 209, in association with the job ID for identifying the print job.

At S717, the distributor 203 instructs the drawing program 702 to complete drawing of page data. At S718, the distributor 203 instructs the drawing program 702 to end the print job. At S719, the drawing program 702 notifies the print driver 204 of completion of the print job.

When the notification indicating completion of the print job is received, at S720, the printer driver 204 provides the converted print data in RAW data format to the language monitor 206, and causes the language monitor 206 to send the print data to the printer 120 controlled by the printer driver 204. At S721, the communication device 207 of the language monitor 206 sends the converted print data to the printer 120 through the network 130.

At S722, the printer driver 204 sends the log relating to the print job to the language monitor 206 with an instruction to store the log, and the drawing processing ends. At S723, the job data processor 208 of the language monitor 206 stores the job data, such as the log related to the print job, in the storage device 209 in association with the job ID for identifying the print job. In case the error information for the print job is stored in the storage device 209 at S716, the job data processor 208 does not have to store the error information at S723 as the job data.

The upper-level program, such as the application 200, may inquire about whether the print job is successfully completed, or whether there is any error information related to the print job, at any desired time. At S724 to S726, the application 200 may request the printer driver 204 to inquire about the log related to the print job, via the virtual driver 201 and the drawing program 702.

At S727, the printer driver 204 instructs the language monitor 206 to obtain a log for the print job identified by a specific job ID, specified by the application 200. At S728, the language monitor 206 reads out the log associated with the specified job ID in response to the instruction, and sends the obtained log to the printer driver 204. At S729 to S731, the printer driver 204 sends the obtained log to the application 200 through the virtual driver 201 and the drawing program 702.

Alternatively, the application 200 may transmit the instruction for obtaining a log, directly to the language monitor 206, without intervening the virtual driver 201, the drawing program 702, and the printer driver 204. In such case, the language monitor 206 may transmit the log to the application 200 directly, in response to such request.

As described above, in the print system 500 that executes print processing using the print server 540, even when an error occurs during processing executed by the printer driver 204 or the electronic file driver 205 in the print server 540, the upper-level program such as the application 200 or the virtual driver 201 in the client 510 is able to obtain job data such as error information.

In any one of the above-described examples, the driver, such as the printer driver 204 or the electronic file driver 205, sends job data such as error information to the higher-level program such as the application 200. The job data to be transmitted does not only include the error information, but may alternatively or additionally include any information relating to the job that can be stored in association with the job ID.

For example, the job data may include destination information indicating a destination to which the print data is transferred, which may be obtained from the higher-level program such as the application 200. For example, the printer driver 204 may obtain information regarding the usage of the printer 120 such as the number of jobs to be processed, from a printer queue or the printer 120. Based on such information regarding the usage, the printer driver 204 may change the destination to which the print data is transferred, such as a destination port. In view of this, as long as the destination to which the print data is transferred is stored as the job data, the higher-level program such as the application 200 is able to obtain information regarding the destination to which the print data is transferred, even when a destination is changed based on the usage of the printer.

The information regarding the destination to which the print data is transferred, such as the destination printer, may include an address of the destination printer such as an IP address, and a name of the destination printer.

Figure 8:
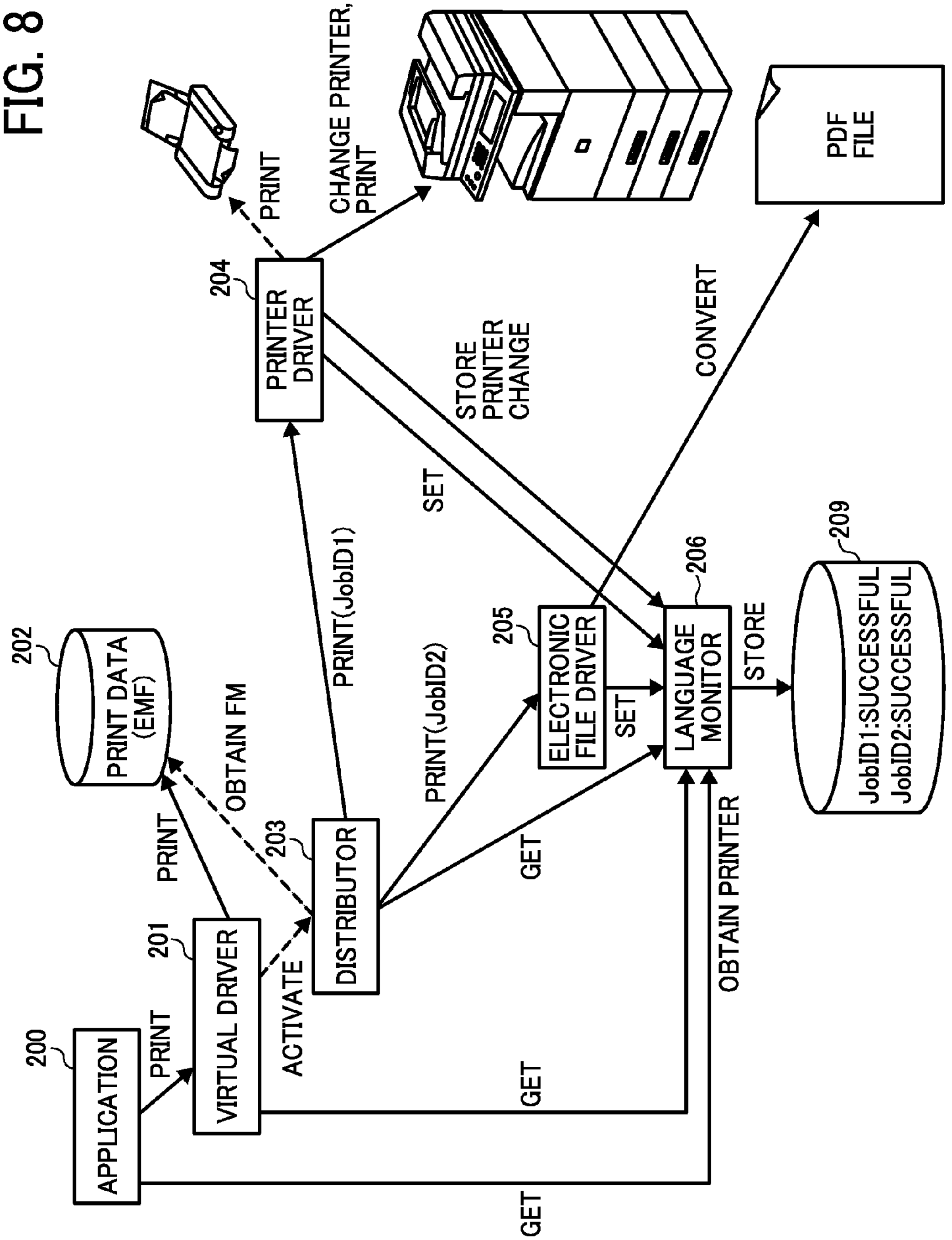
FIG. 8 is an illustration for explaining operation of storing information indicating a destination to which print data is transferred.

FIG. 8 is an illustration for explaining example operation of changing a destination printer. The virtual driver 201 instructs the drawing program 400 to generate print data in EMF, and spool the print data in the storage device 202, according to a user instruction received at the application 200. In this example, the user instruction includes an instruction for printing data using a first printer, and an instruction for storing data in PDF. The drawing program 400 may generate a job ID 1 for the print job, and a job ID 2 for the PDF job. The job ID 1 and the job ID 2 are respectively stored in the storage device 209.

The virtual driver 201 activates the distributor 203 to cause the printer driver to perform conversion from the print data having an intermediate data format to an output data format. In this example, it is assumed that the printer driver 204 converts the print data in EMF to converted print data in RAW. The electronic file driver 205 converts the print data in EMF to an electronic file in PDF.

In the process of processing printing, the printer driver 204 changes a destination printer from the first printer to a second printer based on the usage information of the printer. In such case, the printer driver 204 instructs the language monitor 206 to store information indicating a new destination printer. After completing the print job and the PDF job, the language monitor 206 stores information indicating that the job is successful.

At any desired time, the upper-level program, such as the application 200, may send an inquiry to the language monitor 206, either directly or indirectly, to request for information regarding the job, such as information indicating the new destination printer.

Figure 9:
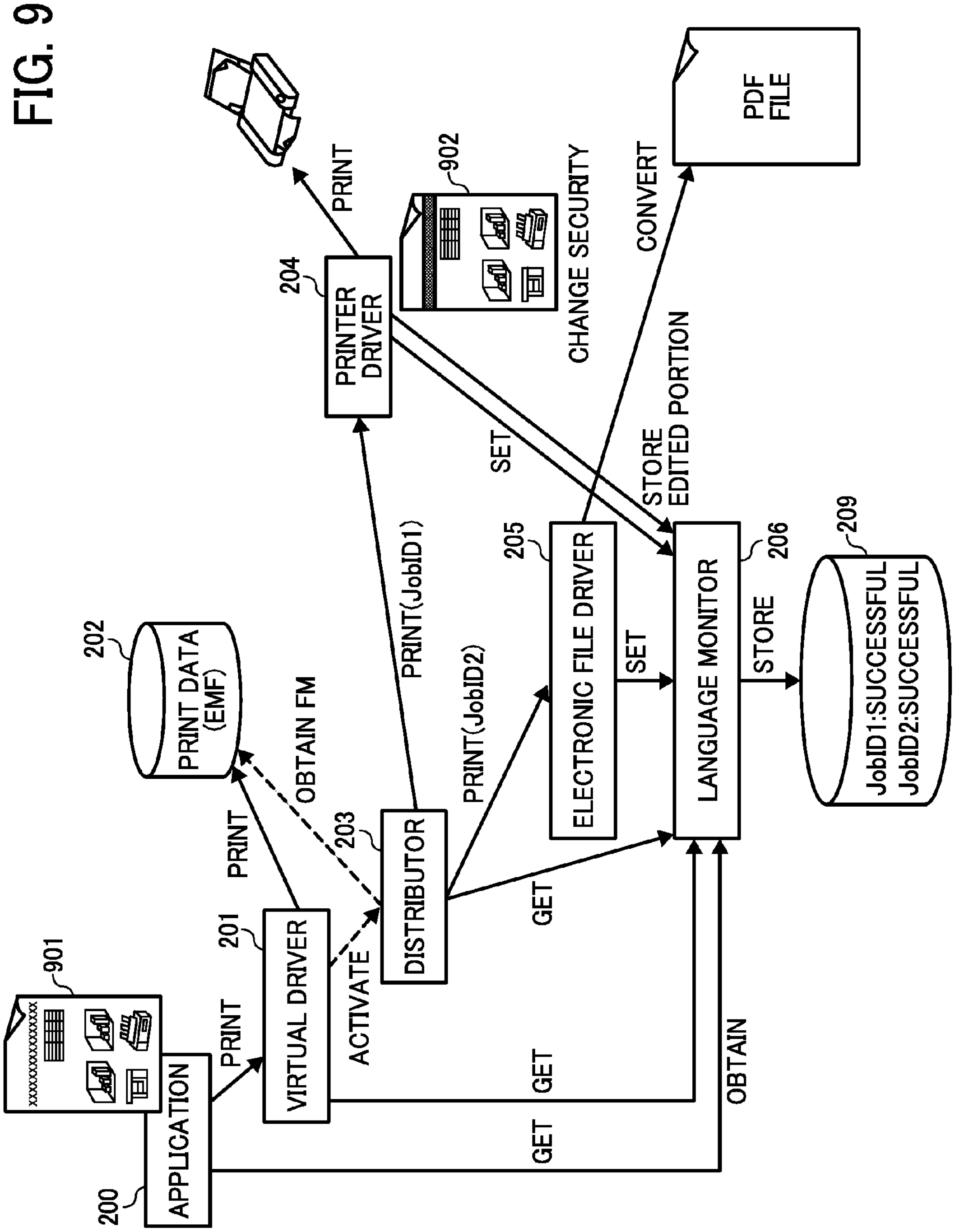
FIG. 9 is an illustration for explaining operation of storing information indicating the edited contents of print data.

In another example, the job data may include information indicating the change in contents of the job data. FIG. 9 is an illustration for explaining example operation of storing information indicating that print data is edited. In FIG. 9, it is assumed that the printer driver 204 edits print data 901 to generate print data 902, and the language monitor 206 stores information indicating the edited contents in the storage device 209 as job data.

In any one of the above-described examples, output processing information, such as job data, corresponds to output processing information relating to output processing executed by the driver such as the printer driver 204 or the electronic file driver 205.

In this example, the output processing information does not have to be limited to the above-described output processing information relating to processing performed by the driver, such as the printer driver 204 or the electronic file driver 205, which may need to be notified to the higher-level program such as the application 200. Alternatively, the output processing information may be any output processing information relating to processing performed by the upper-level program, such as the application 200, which may need to be notified to the driver.

For example, the print processing to be performed by the printer controlled by the printer driver 204, and the output processing of an electronic file to be performed by the electronic file driver 205 may be performed in concurrently. Assuming that an error occurs during the print processing performed by the printer driver 204, even when only the output processing performed by the electronic file driver 205 is completed, it may be desirable to delete the electronic file being output by the electronic file driver 205 to ensure consistency.

When the error occurs in the print processing executed by the printer driver 204, information that the application 200 instructs error recovery processing may be transmitted to the driver, through the language monitor 206. The processing that may be instructed in case the error occurs may not only be limited to the error recovery processing, such that any processing may be instructed as long as it can be executed in relation to the output processing being executed by the driver.

Figure 10:
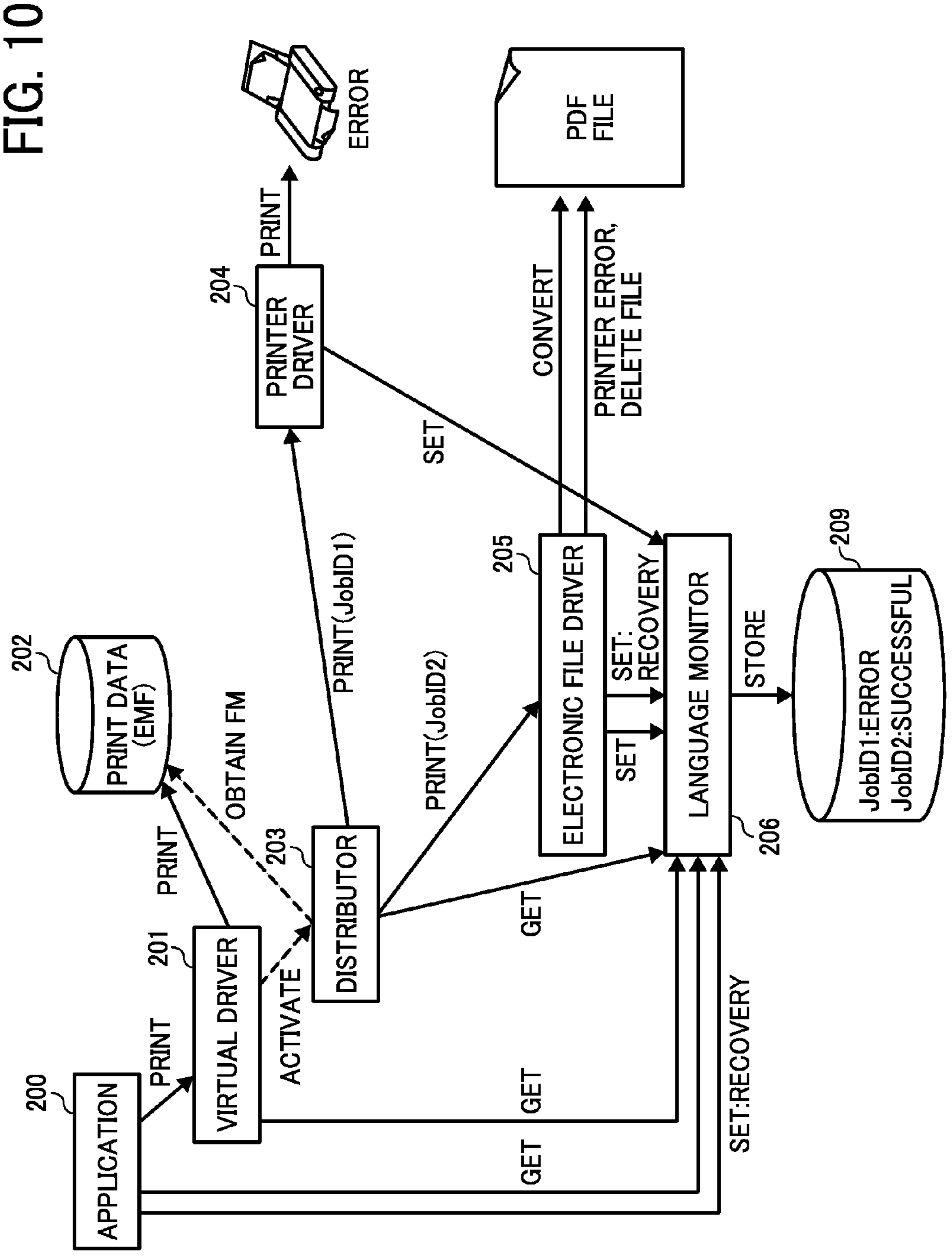
FIG. 10 is an illustration for explaining operation of storing information instructing recovery operation.

FIG. 10 is an illustration for explaining example operation of storing information relating to an instruction for performing error recovery processing. In FIG. 10, it is assumed that the application 200 instructs an instruction for performing recovery processing to delete the electronic file being output by the electronic file driver 205, when an error occurs in print processing being performed by the printer driver 204.

Figure 11:
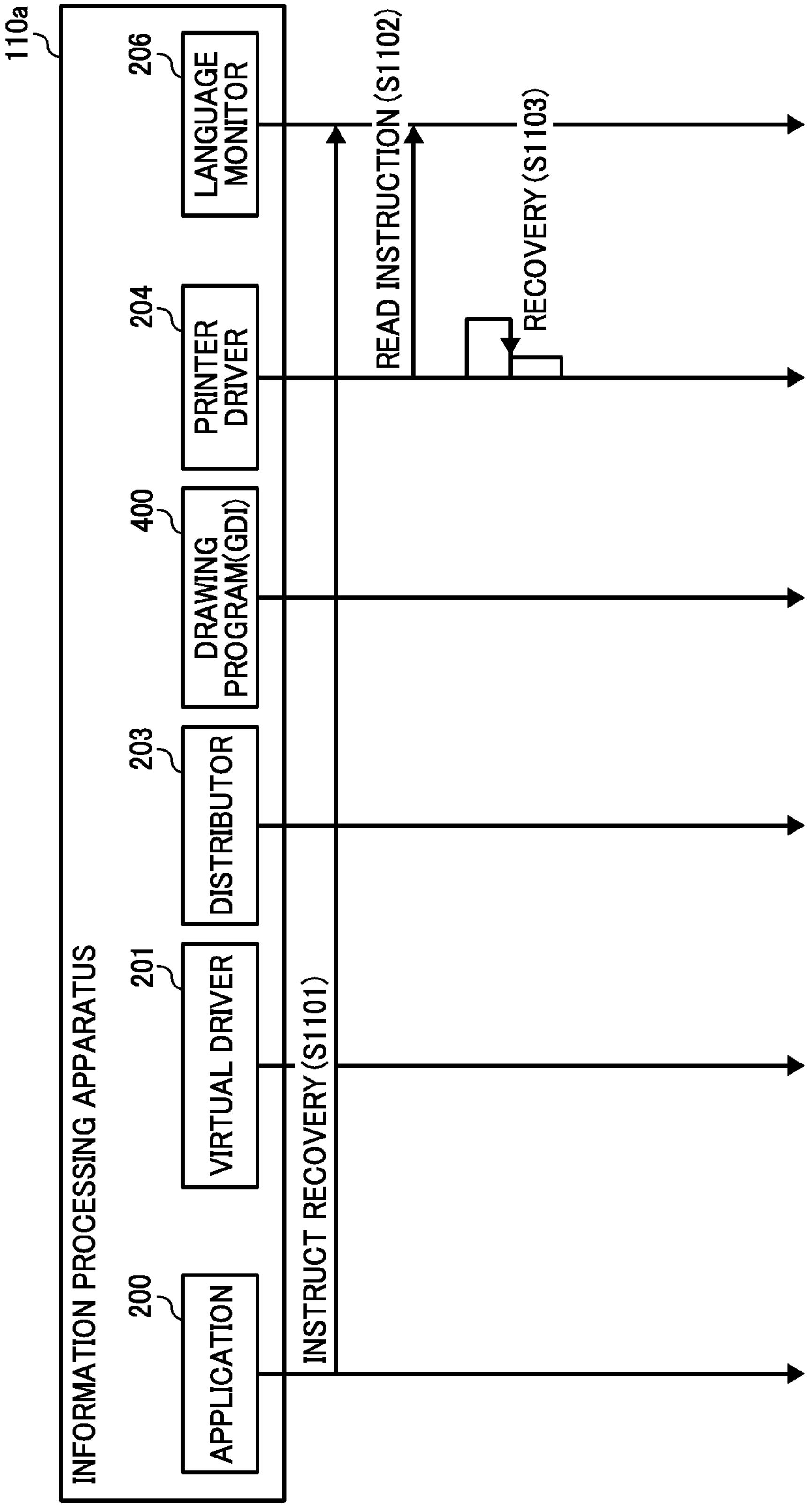
FIG. 11 is a data sequence diagram illustrating operation of recovery processing, performed by the information processing apparatus of FIG. 1, according to an example embodiment of the present invention.

FIG. 11 illustrates a data sequence diagram illustrating operation of performing error recovery processing, performed by the information processing apparatus 110*a* of the print system 100 of FIG. 1.

For example, assuming that the application 200 receives the log indicating occurrence of an error at S430 of FIG. 4, the application 200 starts recovery operation of FIG. 11. In FIG. 11, the printer driver 204 performs recovery processing. Alternatively, the electronic file driver 205 may perform recovery processing in a substantially similar manner as described referring to FIG. 11.

At S1101, the application 200 instructs the language monitor 206 to store information indicating an instruction to perform error recovery processing. The information regarding the recovery processing may include, but not limited to, the job ID for the job in which an error occurs, and specific contents of recovery processing. Alternatively, the specific contents of the recovery processing may be generated by the language monitor 206 in response to the instruction received from the application 200.

At S1102, the printer driver 204 sends an inquiry to the language monitor 206 to obtain information indicating a recovery instruction that instructs to perform recovery processing is stored. For example, the printer driver 204 may periodically send an inquiry to the language monitor 206 for any information. Alternatively, the printer driver 204 may send a request to the language monitor 206, which inquires about whether the information indicating the recovery instruction is stored for the job ID of the job being output, such as the job ID of the job being output in error. The printer driver 204 reads the information indicating the recovery instruction. At S1103, when the information indicating the recovery instruction is obtained, the printer driver 204 performs recovery processing for the job being specified by the job ID.

In the above-described example referring to FIG. 11, the higher-level program, such as the application 200, instructs to perform recovery processing. Alternatively, the recovery processing may be instructed by the driver, such as the printer driver 204 or the electronic file driver 205, to the higher-level program. The recovery processing may be performed by any one of the higher-level program, the driver such as the printer driver 204 or the electronic file driver 205, and the language monitor 206.

The SendRecvBidiDataFromPort, which is the API, may be commonly used for instructing storing (set) of information to the language monitor 206, and instructing obtaining (get) of information from the language monitor 206. In case the Windows OS is used, the API "SendRecvBidiDataFromPort" may be commonly used for instructing storing of information indicating the recovery instruction, and instructing reading out such information.

In this example, processing to be performed in relation to output processing being executed by the driver, such as information relating to the recovery processing, is used as an example of output processing information related to output processing being executed by the printer driver 204 or the electronic file driver 205.

As described above, with the language monitor 206 provided with the function of managing output processing information, output processing information such as error information or recovery instruction information may be transmitted or received between the higher-level program and the driver.

Figure 12:
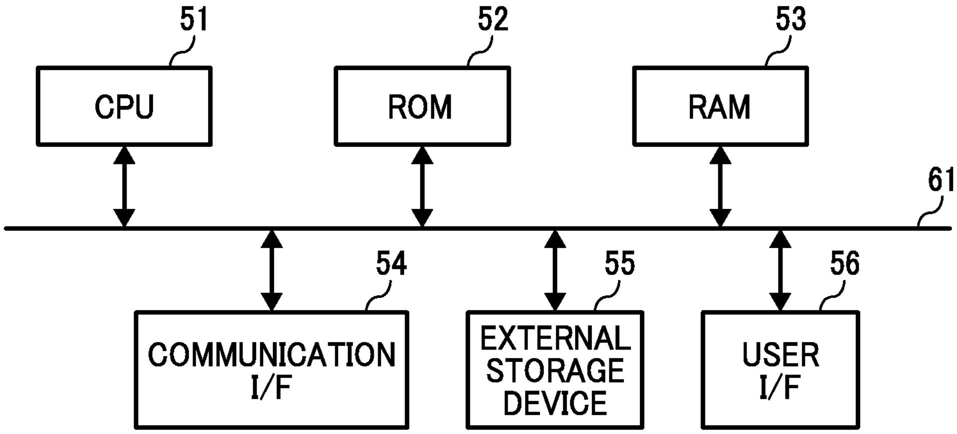
FIG. 12 is a schematic block diagram illustrating a hardware structure of the information processing apparatus provided in the print system of FIG. 1 or 5, according to an example embodiment of the present invention.

Referring now to FIG. 12, a hardware structure of the information processing apparatus, such as the information processing apparatus 110, the client 510, or the print server 540, is explained according to an example embodiment of the present invention. The information processing apparatus includes a processor such as a central processing unit (CPU) 51, a memory such as a read only memory (ROM) 52 and a random access memory (RAM) 53, a communication OF 54 that allows communication via a network, an external storage device 55 such as a hard disk drive (HDD) or a compact disc (CD) drive, and a user OF 56 such as an output device including a display, an input device including a keyboard or a mouse, which are connected through a bus 61.

The program to be executed by the information processing apparatus may be stored in a non-transitory, computer readable recording medium, in any desired installable or executable format. The examples of such recording medium include, but not limited to, CD-ROM, flexible disk, CD-R, and DVD. The program stored in the recording medium may be distributed in the form of a computer program product.

Alternatively, the program to be executed by the information processing apparatus may be stored in any desired storage device, such as a computer connected through a network such as the Internet. The program may be downloaded, provided, or distributed, via the network, to be installed onto any desired information processing apparatus. Alternatively, the program to be executed by the information processing apparatus may be embedded into a memory, such as the ROM 52 of the information processing apparatus.

The program to be executed by the information processing apparatus, when deployed, causes the information processing apparatus to have at least a part of a plurality of modules as illustrated in FIG. 2 or 5. More specifically, the processor such as the CPU 51 reads out the program from any desired memory to execute the read program, and causes at least a part of the plurality of modules be loaded onto the main memory to have a functional structure as illustrated in FIG. 2 or 5.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

In one example, the present invention may reside in an information processing apparatus including a generator that generates output data in an intermediate data format, a driver that converts the output print data to converted output data having an output data format, and an interaction device that transfers the converted output data received from the driver to a destination. The interaction device stores output processing information relating to output processing being performed or to be performed by the driver, in association with identification information for identifying the output processing. In response to a request from an upper-level program, the interaction device sends the output processing information associated with the identification information to the upper-level program. In one example, the interaction device is a language monitor.

In one example, the output processing information includes any one or any combination of: 1) error information indicating an error occurred during the output processing performed by the driver; 2) information indicating a destination to which the output data is transferred; 3) information indicating the contents of the output data edited by the driver; and 4) processing information regarding processing to be performed in relation to output processing being performed by the driver.

In one example, the present invention may reside in a print system including a generator that generates first print data having an intermediate data format, a driver that converts the first print data to second print data having an output data format, and an interaction device that transfers the second print data to a destination. The interaction device stores output processing information relating to output processing being performed or to be performed by the driver, in association with identification information for identifying the output processing. In response to a request from an upper-level program, the interaction device sends the output processing information associated with the identification information to the upper-level program. In one example, the interaction device is a language monitor.

In one example, the output processing information includes any one or any combination of: 1) error information indicating an error occurred during the output processing performed b the driver; 2) information indicating a destination to which the second print data is transferred; 3) information indicating the contents of the first print data edited by the driver; and 4) processing information regarding processing to be performed in relation to output processing being performed by the driver.

In one example, the present invention may reside in a computer-readable program, stored in a non-transitory recording medium, which causes an interaction device that transfers second print data having an output data format to a destination, the second print data being converted from first print data having an intermediate data format by a driver, to perform the following. The interaction device stores output processing information relating to output processing performed the driver in association with identification information for identifying the output processing; and sending the output processing information associated with the identification information to an upper-level program in response to a request from the upper-level program.

In one example, the present invention may reside in an information processing system including: means for instructing generation of output data having an intermediate data format based on data in response to an output processing request for performing output processing on the data; means for determining a destination to which the output data is transferred for output based on the output processing request, the means for determining being associated with the destination; means for converting the output data from the intermediate data format to an output data format, the output data format being compatible with the destination to which the output data is transferred for output; means for sending output data identification information to an upper-level program, the output data identification information identifying the output data being generated, or the output processing being performed or to be performed on the output data; means for controlling transfer of the output data having the output data format to the destination; and means for controlling interaction between the upper-level program and a lower-level program, the interaction including relaying the output data having the output data format to the means for controlling transfer of the output data. The means for controlling interaction includes: means for storing output processing information relating to the output processing being performed or to be performed on the output data, in association with the output data identification information; and means for sending the output processing information associated with the output data identification information to the upper-level program, in response to the output data identification information received from the upper-level program.

In one example, the means for instructing corresponds to a virtual driver. The means for determining corresponds to the distributor. The means for sending corresponds to a drawing program, such as a GDI. The means for converting corresponds to a real driver, such as a printer driver or an electronic file driver. The means for controlling interaction corresponds to a language monitor. By providing the function of storing the output processing information, in association with the output data identification information, to the language monitor, the language monitor can manage the output processing information. By further providing the function of sending the output processing information in response to the output data identification information received from the upper-level program, the upper-level program is able to obtain the output processing information including information regarding processing being performed, for example, after determining a destination to which the output data is transferred.

More specifically, in one example, the information processing system may be implemented by an information processing apparatus including: a virtual driver that instructs generation of output data having an intermediate data format based on data in response to an output processing request for performing output processing on the data; a distributor that determines a destination to which the output data is transferred for output based on the output processing request, the distributor being associated with the destination; a real driver that converts the output data from the intermediate data format to an output data format, the output data format being compatible with the destination to which the output data is transferred for output; a graphics device interface that sends output data identification information to an upper-level program, the output data identification information identifying the output data being generated, or the output processing being performed or to be performed on the output data; a port monitor that controls transfer of the output data having the output data format to the destination; and a language monitor that controls interaction between the upper-level program and a lower-level program, the interaction including relaying the output data having the output data format to the port monitor. The language monitor stores output processing information relating to the output processing being performed or to be performed on the output data, in association with the output data identification information, and sends the output processing information associated with the output data identification information to the upper-level program, in response to the output data identification information received from the upper-level program.

The output data identification information may be any desired identification information for identifying the output data, or any desired identification information for identifying the output processing being performed or to be performed on the output data, such as a job ID that is uniquely assigned, for example, by an operating system (OS). For example, the GDI may generate the job ID.

The upper-level program includes any one of application, a virtual driver, and a distributor. The lower-level program includes any one of the real driver and a port monitor.

In another example, the means for controlling interaction is further provided with means for storing processing information related to the output processing information, in association with the output data identification information, in response to the output data identification information received from the upper-level program.

In this example, the output processing information relates to any processing being performed or to be performed by the lower-level program. Examples of the output processing information include, but not limited to, error information indicating an error occurred during the output processing performed by the means for converting, information indicating a destination to which the output data is transferred, information indicating the contents of the output data edited by the means for converting, processing information regarding processing to be performed in relation to the output processing performed by the means for converting, and information indicating the state of an output apparatus. The output apparatus may functions as the destination, which outputs the output data.

In alternative to the example case of the information processing apparatus, the information processing system may be implemented by a server-client system in which one or more clients are capable of communicating with a server. For example, the means for instructing may be provided in the client. The means for determining, the means for sending, means for converting, and the means for controlling interaction may be provided in the server.

In one example, the present invention may reside in an information processing method, performed by an information processing apparatus or system. The information processing method includes: instructing generation of output data having an intermediate data format based on data in response to an output processing request for performing output processing on the data; determining a destination to which the output data is transferred for output based on the output processing request; converting the output data from the intermediate data format to an output data format, the output data format being compatible with the destination to which the output data is transferred for output; sending output data identification information to an upper-level program, the output data identification information identifying the output data being generated, or the output processing being performed or to be performed on the output data; relaying the output data having the output data format to means for controlling transfer, using means for controlling interactions between the upper-level program and a lower-level program; transferring the output data having the output data format to the destination, using the means for controlling transfer; storing output processing information relating to the output processing being performed or to be performed on the output data, in association with the output data identification information; and sending the output processing information associated with the output data identification information to the upper-level program, in response to the output data identification information received from the upper-level program.

In one example, the present invention may reside in a non-transitory recording medium storing a plurality of instructions which, when executed by a processor, cause the processor to perform the above-described information processing method. More specifically, the information processing program may be provided, which causes the processor to add specific functions to the means for controlling interaction between the upper-level program and the lower-level program, such as the language monitor. The specific functions include the function of storing output processing information relating to the output processing being performed or to be performed on the output data, in association with the output data identification information; and the function of sending the output processing information associated with the output data identification information to the upper-level program, in response to the output data identification information received from the upper-level program.

In alternative to installing the specific function to an information processing apparatus, the specific function of the means for controlling interaction, such specific function may be previously provided before the apparatus is shipped to the user.

What is claimed is:

1. An information processing system, comprising:

means for instructing generation of output data having an intermediate data format based on data in response to an output processing request for performing output processing on the data;

means for determining a destination to which the output data is transferred for output based on the output processing request, the means for determining being associated with the destination;

a converter configured to convert the output data from the intermediate data format to an output data format, the converter including a print driver and an electronic file driver, the print driver configured to generate print data and the electronic file driver configured to generate an electronic file having the output data format which is compatible with the destination to which the output data is transferred for output, the intermediate data format being an Enhanced Metafile (EMF), the output data format being a RAW format, and the electronic file having a Portable Document Format (PDF);

means for sending output data identification information to an upper-level program after the means for determining determines the destination, the output data identification information identifying one of a plurality of the destinations that the output data has been transferred to by the print driver or the electronic file driver;

means for controlling transfer of the output data having the output data format to the destination; and means for controlling interaction between the upper-level program and a lower-level program, the interaction including relaying the output data having the output data format to the means for controlling transfer of the output data, wherein the means for controlling interaction includes:

means for storing output processing information relating to the output processing being performed or to be performed on the output data, in association with the output data identification information; and means for sending the output processing information associated with the output data identification information to the upper-level program, in response to the output data identification information received from the upper-level program.

2. The information processing system of claim 1, wherein the means for controlling interaction further includes:

means for storing processing information related to the output processing information, in association with the output data identification information, in response to the output data identification information received from the upper-level program.

3. The information processing system of claim 1, wherein the lower-level program performs processing after the means for determining determines a destination to which the output data is transferred, the lower-level program including at least one of the converter or the means for controlling transfer of the output data.

4. The information processing system of claim 1, wherein the upper-level program includes application that receives a user instruction for outputting data.

5. The information processing system of claim 1, wherein the output processing information includes any one or any combination of:

error information indicating an error occurred during the output processing performed by the converter;

information indicating a destination to which the output data is transferred;

information indicating the contents of the output data edited by the converter;

processing information regarding processing to be performed in relation to the output processing performed by the converter; and information indicating the state of an output apparatus.

6. The information processing system of claim 5, wherein the processing information regarding processing to be performed in relation to the output processing includes an error recovery instruction.

7. The information processing system of claim 1, wherein the means for controlling interaction includes a language monitor.

8. The information processing system of claim 1, wherein the converter includes a plurality of drivers, which are respectively associated with a plurality of destinations.

9. The information processing system of claim 8, wherein, when the upper-level program receives the output processing information indicating that an error occurred during when the output processing is being performed by one of the plurality of drivers, the upper-level program sends an error recovery instruction to the means for controlling interaction, and the means for controlling interaction stores information regarding the error recovery instruction to allow the error recovery instruction to be read by at least one of the plurality of drivers.

10. The information processing system of claim 1, wherein the information processing system includes a client and a server.

11. An information processing apparatus, comprising:

a processor and a memory, the memory containing computer readable code that, when executed by the processor, configures the processor as, a virtual driver that instructs generation of output data having an intermediate data format based on data in response to an output processing request for performing output processing on the data;

a distributor that determines a destination to which the output data is transferred for output based on the output processing request, the distributor being associated with the destination;

a real driver that converts the output data from the intermediate data format to an output data format, the real driver including print driver and an electronic file driver, the print driver configured to generate print data and the electronic file driver configured to generate an electronic file having the output data format which is compatible with the destination to which the output data is transferred for output, the intermediate data format being an Enhanced Metafile (EMF), the output data format being a RAW format, and the electronic file having a Portable Document Format (PDF);

a graphics device interface that sends output data identification information to an upper-level program after the distributor determines the destination, the output data identification information identifying one of a plurality of the destinations that the output data has been transferred to by the print driver or the electronic file driver;

a port monitor that controls transfer of the output data having the output data format to the destination; and a language monitor that controls interaction between the upper-level program and a lower-level program, the interaction including relaying the output data having the output data format to the port monitor, wherein the language monitor is configured to:

store output processing information relating to the output processing being performed or to be performed on the output data, in association with the output data identification information; and send the output processing information associated with the output data identification information to the upper-level program, in response to the output data identification information received from the upper-level program.

12. The information processing apparatus of claim 11, wherein the language monitor is further configured to store processing information related to the output processing information, in association with the output data identification information, in response to the output data identification information received from the upper-level program.

13. The information processing apparatus of claim 11, wherein the lower-level program performs processing after the distributor determines a destination to which the output data is transferred, the lower-level program including at least one of the real driver or the port monitor.

14. The information processing apparatus of claim 11, wherein the upper-level program includes application that receives a user instruction for outputting data.

15. The information processing apparatus of claim 11, wherein the output processing information includes any one or any combination of:

error information indicating an error occurred during the output processing performed by the real driver;

information indicating a destination to which the output data is transferred;

information indicating the contents of the output data edited by the real driver;

processing information regarding processing to be performed in relation to the output processing performed by the real driver; and information indicating the state of an output apparatus.

16. The information processing apparatus of claim 11, wherein the real driver includes a plurality of real drivers, which are respectively associated with a plurality of destinations.

17. The information processing apparatus of claim 16, wherein, when the upper-level program receives the output processing information indicating that an error occurred during when the output processing is being performed by one of the plurality of real drivers, the upper-level program sends an error recovery instruction to the language monitor, and the language monitor stores information regarding the error recovery instruction to allow the error recovery instruction to be read by at least one of the plurality of real drivers.

18. An information processing method, comprising:

instructing generation of output data having an intermediate data format based on data in response to an output processing request for performing output processing on the data;

determining a destination to which the output data is transferred for output based on the output processing request;

converting, by a print driver and an electronic file driver, the output data from the intermediate data format to an output data format by, generating, via the print driver, print data, and generating, via the electronic file driver, an electronic file having the output data format which is compatible with the destination to which the output data is transferred for output, the intermediate data format being an Enhanced Metafile (EMF), the output data format being a RAW format, and the electronic file having a Portable Document Format (PDF);

sending output data identification information to an upper-level program after determining determines the destination, the output data identification information identifying one a plurality of the destinations that the output data has been transferred to by the print driver or the electronic file driver;

relaying the output data having the output data format to means for controlling transfer, using means for controlling interactions between the upper-level program and a lower-level program;

transferring the output data having the output data format to the destination, using the means for controlling transfer;

storing output processing information relating to the output processing being performed or to be performed on the output data, in association with the output data identification information, using the means for controlling interactions; and sending the output processing information associated with the output data identification information to the upper-level program, in response to the output data identification information received from the upper-level program, using the means for controlling interactions.

19. The information processing method of claim 18, further comprising:

storing processing information related to the output processing information, in association with the output data identification information, in response to the output data identification information received from the upper-level program.

* * * * *